Oct. 26, 1937.  E. E. WEMP  2,097,203
MECHANISM FOR OPERATING CLUTCHES OR THE LIKE
Filed Nov. 2, 1935  3 Sheets-Sheet 1
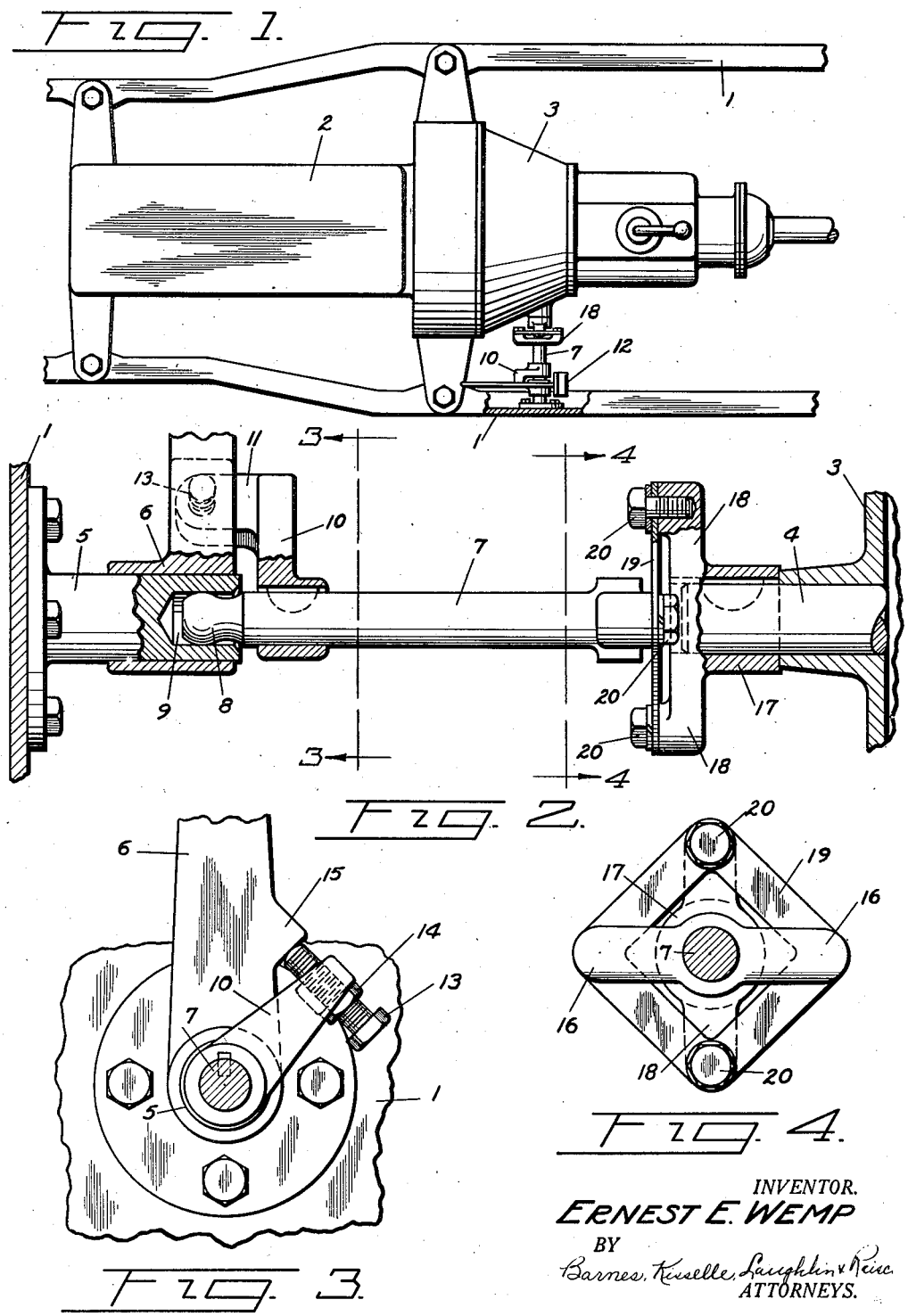
INVENTOR.
ERNEST E. WEMP
BY
Barnes, Kisselle, Laughlin & Reine
ATTORNEYS.

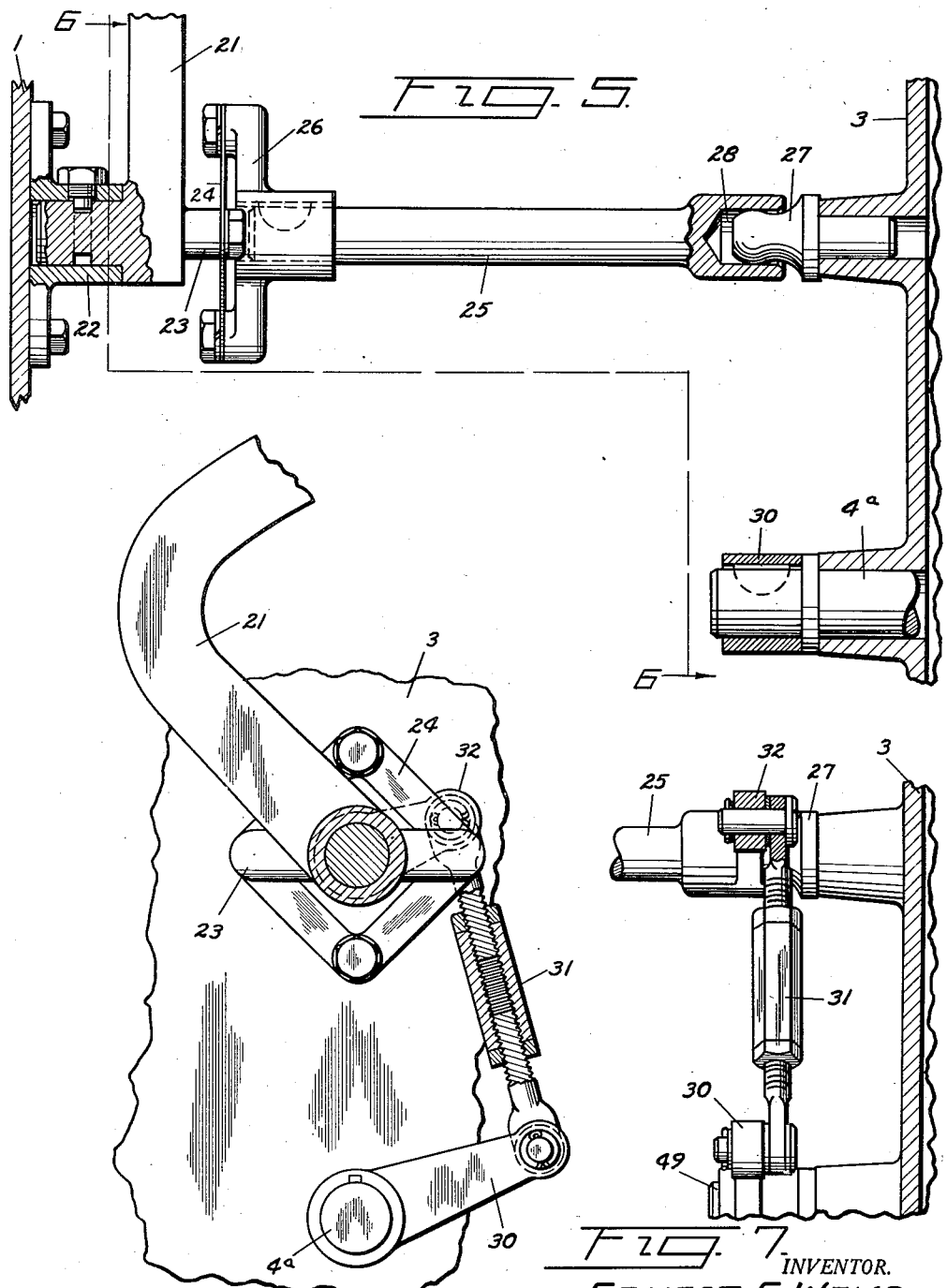

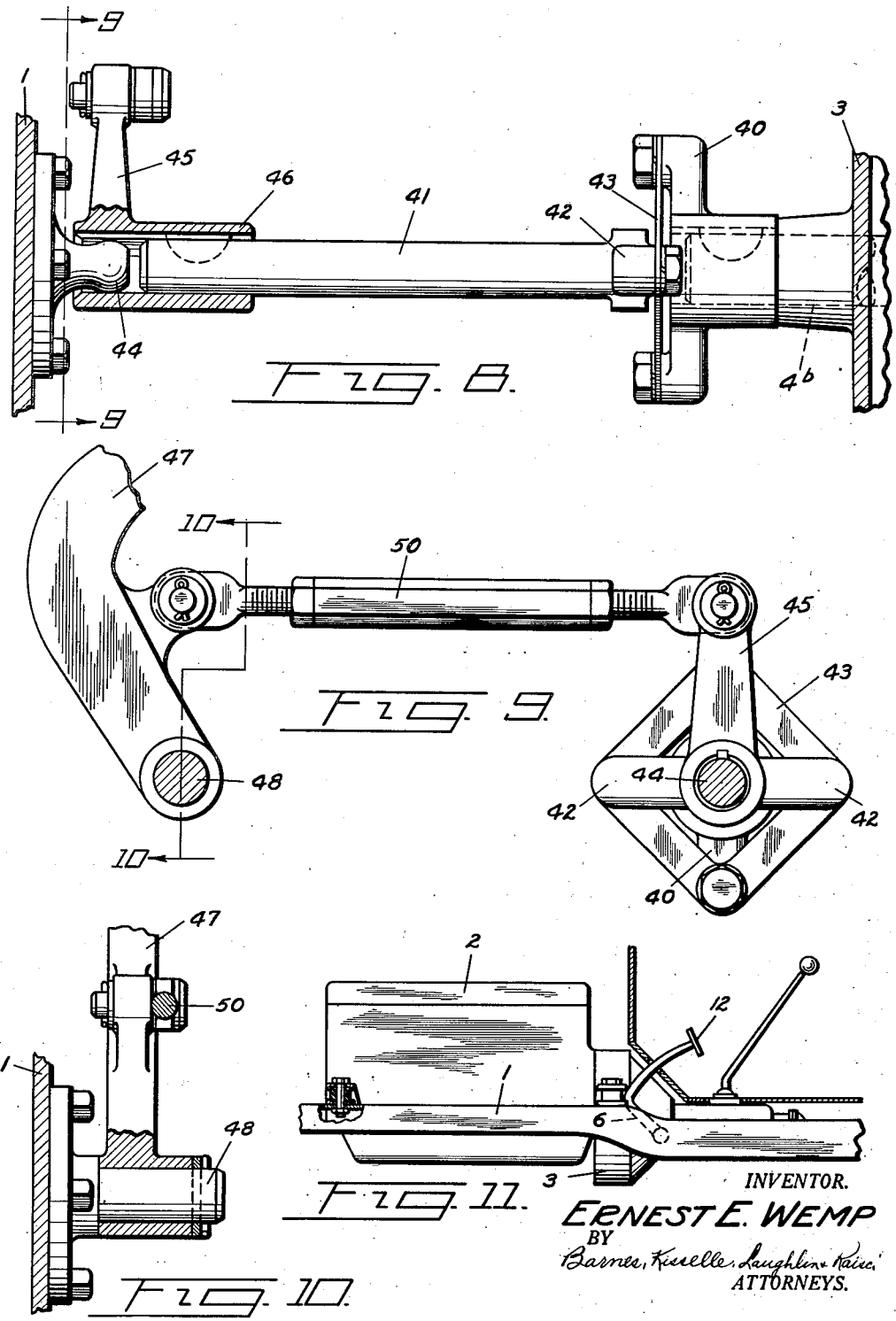

Patented Oct. 26, 1937

2,097,203

UNITED STATES PATENT OFFICE 2,097,203

MECHANISM FOR OPERATING CLUTCHES OR THE LIKE

Ernest E. Wemp, Detroit, Mich.

Application November 2, 1935, Serial No. 47,925

12 Claims. (Cl. 180—64)

This invention relates to mechanism for effecting an operation of a mechanical device which is mounted in such a way that it is capable of movement. More specifically, the invention has to do with a mechanism for effecting a controlling operation of a device which either forms a part of, or is mounted on or in, an engine, which in turn is mounted for movement. For example, the device to be operated or controlled may be a clutch.

In automotive vehicles it is largely the practice to mount the engine so that the same is capable of movement bodily either with a rocking or an oscillating movement or otherwise. Some engines are mounted in rubber supporting blocks. The clutch which is operated by the conventional clutch pedal extending up through the floor boards of the car usually functions in connection with a rock-shaft carried by the engine. It is, of course, undesirable to have the clutch releasing lever oscillate or move with the engine. Also, since a considerable force is required to release the clutch, means must be provided so that the engine does not have to overcome or react against this force, since the force would tend to shift the engine in its mounting and thus result in an imperfect clutch operation. When the clutch is released there is only a few thousandths of an inch clearance between the clutch driving and driven members, and it will readily be appreciated that if there is any substantial fore and aft shift of the engine on its mounting, due to the clutch releasing pressure, the clutch will not be properly or entirely disengaged. Heretofore, a linkage system comprising parallel links or levers has been used to relieve the engine of the pressure which the operator exerts on the lever to release the clutch, but this is objectionable because of the extreme accuracy required and the infeasibility of maintaining such accuracy, and also because of the cost.

The present invention has as its principal object the provision of an improved mechanism for operating a clutch or other device on an engine or other element which is mounted to rock or shift, and by means of which the operation of the mechanism does not impart any force to the engine which tends to shift it on its mounting and which does not restrain movements of the engine in its mounting.

In the accompanying drawings:

Fig. 1 is a top plan view showing more or less diagrammatically the engine and frame structure in an automobile, and showing the structure of the invention applied thereto.

Fig. 2 is an enlarged view largely in cross-section showing the details of the structure.

Fig. 3 is a sectional view taken substantially on line 3—3 of Fig. 2.

Fig. 4 is a sectional view taken substantially on line 4—4 of Fig. 2.

Fig. 5 is a view similar to Fig. 2 showing a modified form.

Fig. 6 is a detail view taken substantially on line 6—6 of Fig. 5.

Fig. 7 is another detail view partly in section looking substantially from the right-hand side of Fig. 6.

Fig. 8 is a view similar to Fig. 2 showing a still further modified form.

Fig. 9 is a detail side view thereof, a part of which is taken on section line 9—9 of Fig. 8.

Fig. 10 is a sectional view taken substantially on line 10—10 of Fig. 9.

Fig. 11 is a somewhat diagrammatic view illustrating a vehicle engine, frame and clutch releasing lever from the side.

While the invention may be utilized in an environment other than in connection with the operation of a clutch of an automobile engine, the disclosure herein shows such an arrangement, and it is so described.

The frame of an automobile is shown at 1 in which is mounted an engine 2 having a housing 3 for the flywheel and the usual friction clutch. This clutch may be of a conventional type which is releasable by the operation of a rock-shaft 4 journaled in the housing 3. The engine 2 with its housing 3, as above pointed out, is mounted for movement relative to the frame, as for example, on rubber blocks or the like so that it may oscillate on a longitudinal axis; and also, it may shift lengthwise in the frame if any substantial force is applied to it, although this shift is small. The mechanism of this invention is for rocking the shaft 4 while at the same time permitting the shaft with the engine to oscillate on an axis extending lengthwise of the vehicle frame, and also for rocking the shaft 4 without applying a force to the engine which would tend to shift the same.

To this end the form of the invention shown in Figs. 2, 3 and 4 may comprise a bracket 5 mounted on the frame 1, or other suitable fixed part, and upon which is swiveled a lever 6. A shaft 7 has a ball shaped end 8 disposed in a recess or bore 9 in the bracket 5 so that it may rock and shift axially. Keyed or otherwise fixed to this shaft to rotate therewith is an arm 10 which has an extension 11 disposed in the path of movement of the lever 6. This lever 6 may be the usual clutch releasing lever provided with a foot pedal 12. Preferably, an adjustment is provided which may take the form of an adjusting screw 13 screw threaded into the arm 10 arranged to be held in adjustment by a nut 14. The end of the screw is designed to make contact with an abutment 15 on the lever.

The opposite end of the lever has oppositely extending arms 16. Keyed or otherwise fixed to the shaft 4 is an element 17 with oppositely extending arms 18 similar to the arms 16. The arms on the shaft 7 and rock-shaft 4 are connected for the transmission of rotary motion by a flexible element. This may take the form of a spring steel member of square formation 19, preferably having a central aperture. The arms 16 and 18 are connected to the member 19 preferably at opposite corners as by means of cap screws 20, with the arms 16 extending at right angles to the arms 18.

The operation is as follows: When the lever 6 is rocked clockwise as Fig. 3 is viewed by means of the operator pressing the lever with the foot, the shaft 7 is rocked through the means of the arm 10. This rocking motion is communicated to the rock-shaft 4 and the clutch is released. A purely rotary or rocking action is thus communicated to the shaft 4 and no thrust is imparted to the engine. As the engine rocks on an axis lengthwise of the frame the element 19 flexes as the shafts 4 and 7 come into and out of alignment, and the ball end 8 of the shaft is free to shift in the recess 9. Preferably, the center line of the ball 8 and the point of contact between the screw 13 and abutment 15 are in line. As the ball shifts in the socket 9, the point of contact also shifts so that the alignment is maintained, and in this way turning torque only is communicated to the shaft 7, and there is no lever action tending to cock the shaft 7. As a result there is no movement tending to disalign the shaft 7 out of its axial position and no thrust imparted to the rock-shaft 4 of the engine.

In Fig. 5 an arrangement is shown wherein a mechanical advantage is provided for the lever. In this form as shown the lever 21 is mounted to rock in a bracket 22, and the lever is provided with opposite arms 23 connected to a flexible connecting element 24. The shaft 25 has opposite arms 26 also connected to the flexible element described in connection with Fig. 2. The clutch housing may be provided with a stud 27 with a ball shaped end slidably fitted into a recess 28 in the shaft 25. This structure permits the housing to oscillate relative to the lever. The clutch releasing rock-shaft is shown at 4a to which is fixed an arm 30 which is connected preferably by means of an adjustable link 31 to an arm 32 on the shaft 25. The arm 32 is of less length than arm 30, so that mechanical advantage is obtained for the operator in that the lever has a greater angular movement than the rock-shaft 4a.

A still further form is shown in Figs. 8 to 10 wherein the clutch releasing shaft 4b is provided with opposite arms 40, and the shaft 41 is provided with opposite arms 42, and the opposite arms being connected by a flexible element 43. A stud with a ball formation is shown at 44, and an arm 45 is mounted to rock thereon. The arm 45 has a hub 46 fitting over the stud, and the end of the shaft 41 is keyed to the hub. A throw-out lever is shown at 47 which may be pivoted on a suitable stud or the like 48 fixed to the frame 1, or other suitable support, and a link preferably of adjustable character, shown at 50, connects the lever 47 to the arm 45. By this stucture the lever advantage may be fixed as desired by proportioning the length of the arm 45 relative to the distance between the pivot 48 and the point of connection of the link 50 to the lever; also, the lever may be located in any convenient place relative to the clutch releasing rock-shaft. In the form shown in Figs. 5 to 7, the stud 27 on the engine housing may be positioned thereon at a location which will permit mounting the lever in the desired place.

I claim:

1. In combination with an engine mounted for movement in a supporting frame, an operating rock-shaft carried by the engine, a lever, means fixed relative to the frame upon which the lever is pivotally mounted, a second shaft, the axes of the shafts being normally substantially in alignment, a ball and recess type mounting for one end of the second shaft, and connections between the second shaft and lever and between the second shaft and said rock-shaft, one of said connections being flexible whereby the rock-shaft may tilt relative to the second named shaft.

2. In combination with an engine mounted for movement relative to a supporting frame, an operating rock-shaft journaled in the engine, a lever mounted on a pivot fixed relative to the frame, a second shaft, a ball and recess type mounting for one end of the shaft, an operative connection between the second shaft and the lever and between the second shaft and the said rock-shaft, one of said connections comprising a flexible element connected to spaced radial arms.

3. In combination with an engine mounted for movement relative to a supporting frame, an operating rock-shaft journaled in the engine, a lever mounted on a pivot fixed relative to the frame, a second shaft, a ball and recess type mounting for one end of the shaft, an operative connection between the second shaft and the lever and between the second shaft and the said rock-shaft, one of said connections comprising oppositely disposed arms on the parts so connected with the arms on one part disposed substantially at right angles to the arms on the other part, a steel spring washer of substantially square formation, and means connecting the washer substantially at each corner to one of the said arms.

4. In combination with an engine mounted for movement relative to a supporting frame, a controlling rock-shaft journaled in the engine, a member fixed to the rock-shaft and having oppositely extending arms, a control lever, a fulcrum therefor fixed relative to the frame, a second shaft, said second shaft having opposed arms at one end, a flexible element connected to said opposed arms of the second shaft and the arms on the rock-shaft, the opposite end of the said second shaft having a ball formation slidably received in a recess, and an arm keyed to the second shaft and extended into abutting relation with the lever.

5. In combination with an engine mounted for movement relative to a supporting frame, a controlling rock-shaft journaled in the engine, a member fixed to the rock-shaft and having oppositely extending arms, a control lever, a fulcrum therefor fixed relative to the frame, a second shaft mounted on the axis of the lever fulcrum, said second shaft having opposed arms at one end, a flexible element connected to said opposed arms of the second shaft and the arms on the rock-shaft, the opposite end of the said second shaft having a ball formation slidably received in a recess in the fulcrum, an arm keyed to the second shaft and extended into abutting relation with the lever, the point of abutment between the arm and lever being in line with the center of the ball formation on the end of the second shaft.

6. In combination with an engine mounted for movement relative to a supporting frame, a rock-shaft journaled in the engine, a lever, means fixed relative to the frame upon which the lever is fulcrumed, said means having an axial recess, a second shaft having a ball formation on one end and located in the recess, an arm fixed to rotate with the second shaft and projected for contact with the lever, the point of contact between the arm and lever being substantially in line with the center of the ball formation, and a flexible coupling between the opposite end of the second shaft and said rock-shaft.

7. In combination with an engine mounted for movement relative to a supporting frame, a rock-shaft journaled in the engine, a lever, fulcrum means for the lever fixed relative to the vehicle frame, said fulcrum having an axial recess therein, a second shaft having a ball formation on one end slidably received in the recess, a flexible coupling between the opposite end of the second shaft and said rock-shaft, said shafts and fulcrum means being disposed substantially on similar axes, an arm fastened to the second shaft and extended into a position for contact with the lever, the point of contact with the lever being substantially on the center line of the ball formation.

8. In combination with an engine mounted for movement with respect to a supporting frame, an operating lever, a fulcrum therefor fixed relative to the frame, a shaft, the fulcrum of the lever being in substantial alignment with the axis of the shaft, a universal joint type, coupling between the lever and one end of the shaft, a ball and recess type mounting between the opposite end of the shaft and engine whereby the engine may rock relative to the shaft and shift lengthwise of the shaft, a controlling rock-shaft journaled in the engine, and linkage connecting the first named shaft and the rock-shaft.

9. The combination with an engine mounted for movement with respect to a supporting frame, an operating lever, a fulcrum therefor fixed relative to the frame, a shaft, the fulcrum for the lever being normally substantially in alignment with the axis of the shaft, a universal type coupling between the lever and one end of the shaft, a ball and recess type mounting between the opposite end of the shaft and engine whereby the engine may rock relative to the shaft and shift lengthwise of the shaft, a controlling rock-shaft journaled in the engine, an arm carried by the first mentioned shaft, an arm secured to rotate the rock-shaft, and a link connecting said arms.

10. The combination with an engine mounted for movement relative to a supporting frame, a rock-shaft journaled in the engine, means having opposed arms fixed to the rock-shaft, a second shaft having opposed arms, a spring metal washer-like member connected at spaced points substantially to the ends of said arms, means comprising a ball and recess for mounting the opposite end of the second shaft on a fixed part of the frame, an arm fixed to the second shaft for rotating the same, an operating lever fulcrumed on a fixed part of the frame, and a link connecting the operating lever and said arms.

11. In combination with an engine mounted for movement relative to a frame, a rockable operating member on the engine, a movable control member mounted on the frame for actuating the rockable member, a shaft for transmitting movement from the control member to the rockable member, means operably connecting the shaft to both of said members, one of said connecting means comprising a universal joint type of connection between one end of the shaft and one of said members, and supporting means for the opposite end of said shaft in the form of a ball and recess allowing for relative movement between the shaft and the other of said members in a direction substantially axially of the shaft and in a direction transverse of the shaft.

12. In combination with an engine mounted for movement relative to a frame, an operating rock shaft member journaled in the engine, a control lever member mounted on the frame for imparting rocking motion to the operating rock shaft member on its axis, a rock shaft for transmitting movement from the lever member to the operating rock shaft member, means operably connecting the rock shaft to both of said members, one of said means comprising a universal joint type of connection between the shaft and one of said members for transmitting rotary motion, and means for supporting the rock shaft including a ball and recess joint allowing for relative movement between the rock shaft and one of said members both axially and transversely of the axis of the rock shaft as the engine moves relative to the frame.

ERNEST E. WEMP.